(12) United States Patent
Ellerth et al.

(10) Patent No.: US 7,708,135 B2
(45) Date of Patent: May 4, 2010

(54) FOOD TRANSPORT SYSTEM AND METHOD

(75) Inventors: Ken Ellerth, Glen Ellyn, IL (US); Gavin Walker, Matcham (AU)

(73) Assignee: Restaurant Technology, Inc., Oak Brook, IL (US)

( * ) Notice: Subject to any disclaimer, the term of this patent is extended or adjusted under 35 U.S.C. 154(b) by 0 days.

(21) Appl. No.: 11/977,627

(22) Filed: Oct. 25, 2007

(65) Prior Publication Data

US 2009/0107803 A1  Apr. 30, 2009

(51) Int. Cl.
  *B65G 17/16* (2006.01)
  *B65G 17/12* (2006.01)
  *B65G 17/32* (2006.01)
(52) U.S. Cl. .................. 198/797; 198/801; 198/802
(58) Field of Classification Search .................. 198/797, 198/801, 802
See application file for complete search history.

(56) References Cited

U.S. PATENT DOCUMENTS

| | | | |
|---|---|---|---|
| 718,745 A * | 1/1903 | Winant | 414/142.1 |
| 3,379,321 A | 4/1968 | Weir | |
| 4,181,215 A | 1/1980 | Carpenter | |
| 4,184,584 A * | 1/1980 | Dehlen | 198/706 |
| 4,307,988 A | 12/1981 | Page et al. | |
| 4,957,188 A | 9/1990 | Bavis | |
| 4,989,722 A * | 2/1991 | Kuepper | 198/475.1 |
| 6,357,985 B1 | 3/2002 | Anzani et al. | |
| 6,390,278 B1 | 5/2002 | Brown | |
| 2005/0098411 A1 | 5/2005 | Lawless et al. | |

OTHER PUBLICATIONS

International Searching Authority, International Search Report and Written Opinion, International Application No. PCT/US2008/012066, Dec. 22, 2008.

* cited by examiner

*Primary Examiner*—Gene Crawford
*Assistant Examiner*—Yolanda Cumbess
(74) *Attorney, Agent, or Firm*—Ryndak & Suri LLP (57) ABSTRACT

A food transport system and method are provided for transporting a packaged food item from one floor of a restaurant, such as a cooking or preparation floor, to another floor of the restaurant, such as a serving or dining floor. The food transport system includes a conveyor that transports a food-item supporting carrier along a closed-loop pathway. The carrier includes a rack with a plurality of spaced-apart food-item support members. On an upward portion of the pathway, the carrier passes a pick-up station having a pick-up rack with a plurality of spaced-apart food-item support members, the carrier support members passing between the pick-up support members to pick up the food item. On a downward portion of the pathway, the carrier rack passes through a drop-off rack in a similar manner, thus depositing the food item on the drop-off rack.

11 Claims, 7 Drawing Sheets

FOOD TRANSPORT SYSTEM AND METHOD

FIELD OF THE INVENTION

The present invention relates to conveyors, and more particularly to methods of conveying packaged food items between a lower and an upper floor of a restaurant.

BACKGROUND OF THE INVENTION

In densely populated areas, real estate space is often available only at a premium or of limited square footage which may be on different levels or stories. Thus, it would be desirable in some situations for a quick-service restaurant to operate with a cooking or preparation area on a separate floor from a dining or serving area. A need therefore exists for an efficient, fast, safe and reliable system for transporting packaged food items from the cooking or preparation floor to the dining or serving floor.

BRIEF SUMMARY OF THE INVENTION

In accordance with one aspect of the present invention, a food transport system for transporting food items is provided. In one embodiment, the food transport system includes a conveyor having a closed-loop element defining a closed-loop pathway, the closed-loop pathway having at least one generally upwardly extending portion and at least one generally downwardly extending portion. At least one carrier having an article-supporting carrier rack is pivotally mounted to the closed-loop element, such that the carrier is maintained in a horizontal position as it travels around the closed-loop pathway. The carrier rack is composed of a plurality of spaced-apart article-supporting members. A pick-up station having an article-supporting pick-up rack is associated with the generally upwardly extending section of the conveyor, the pick-up rack comprising a plurality of spaced-apart support members positioned so that at least a portion of the carrier support members pass between at least a portion of the pick-up support members in the upward direction as the carrier travels past the pick-up rack, the at least a portion of the pick-up support members defining a pick-up area. Similarly, a drop-off station having an article-supporting drop-off rack is associated with the generally downwardly extending portion of the conveyor and, the drop-off rack comprising a plurality of spaced-apart support members positioned so that at least a portion of the carrier support members pass between at least a portion of the drop-off support members in the downward direction in a carrier drop-off pass, the at least a portion of the drop-off support members defining a drop-off area.

In one embodiment, the pick-up station includes an inclined pick-up slide adjacent the pick-up rack, the pick-up slide directed downwardly toward the pick-up rack.

In another embodiment, at least a portion of the drop-off rack is inclined to cause an article deposited on the drop-off rack to slide out of the drop-off area before the next carrier drop-off pass.

In yet another embodiment, the carrier rack is pivotally mounted with respect to the closed-loop element to allow the carrier rack to pivot upwardly when its downward path is obstructed.

In still another embodiment, the pick-up rack is pivotally mounted with respect to the pick-up station to allow the pick-up rack to pivot upwardly when the carrier support members are obstructed from passing between the pick-up support members in the upward direction.

In yet another embodiment, the closed-loop element is a belt.

In still another embodiment, the closed-loop element is a chain.

In yet another embodiment, the closed-loop pathway is defined by a track and the closed-loop element is a plurality of hingedly connected travelers constrained to travel along the track.

In accordance with another aspect of the present invention, a method of transporting food items is provided. The method includes the steps of providing a food transport system as in the previous aspect of the invention and causing the closed-loop element to travel around the closed-loop pathway so that at least a portion of the carrier support members pass between at least a portion of the pick-up support members in the upward direction as the carrier travels past the pick-up rack, thus transferring a food item from the pick-up rack to the carrier rack, and at least a portion of the carrier support members pass between at least a portion of the drop-off support members in the downward direction, thus transferring a food item from the carrier rack to the drop-off rack.

In one embodiment, the closed-loop element is caused to travel continuously around the closed-loop pathway.

In another embodiment, the food item is initially placed on an inclined slide adjacent the pick-up rack so that the food item slides into the pick-up area.

In yet another embodiment, an incline is provided to at least a portion of the drop-off rack so that the food item deposited on the drop-off rack slides out of the drop-off area before the next carrier drop-off pass.

DETAILED DESCRIPTION OF THE INVENTION

A system and method for efficiently, quickly, safely and reliably transporting packaged food items from a cooking or preparation floor to a dining or serving floor of a multi-floor quick-service restaurant are described in this section.

Figure 1:
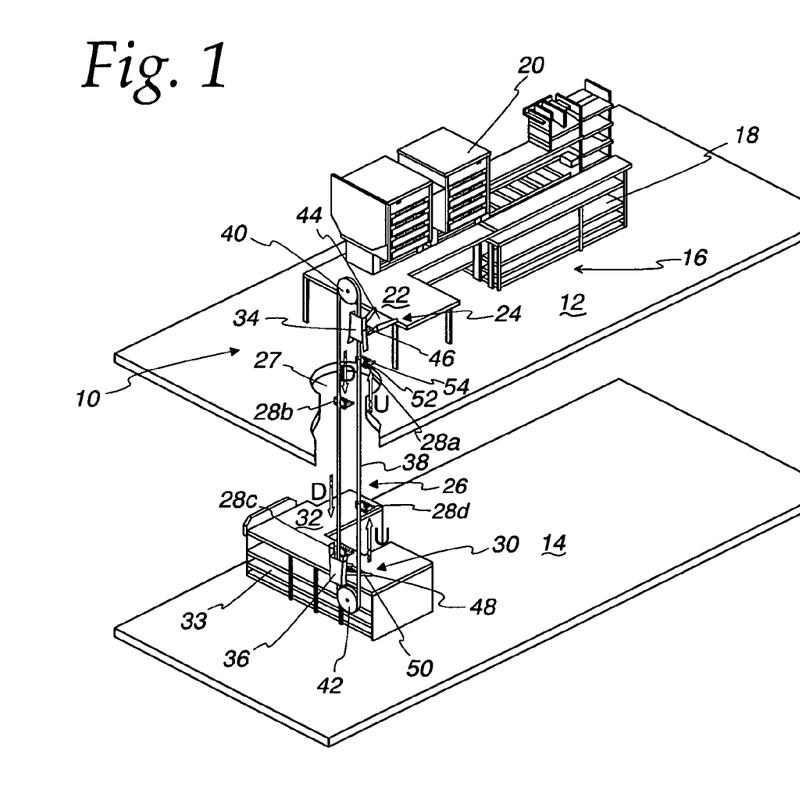
FIG. 1 is a perspective view of a food transport system 10 in a two-floor restaurant with its walls cut away.
Figure 2:
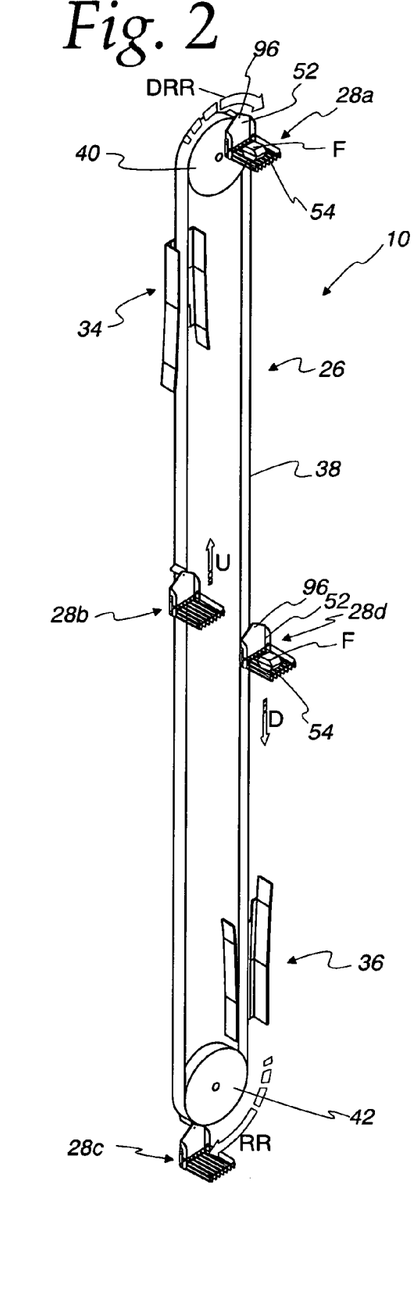
FIG. 2 is a perspective view of food transport system 10 removed from the restaurant, with pick-up and drop-off stations omitted, wherein the closed loop element of the conveyor is a belt.

Referring to FIGS. 1 and 2, a food transport system 10 for transporting packaged food items from an upper cooking or preparation floor 12 to a lower serving or dining floor 14 is illustrated in perspective view. It should be noted that the floor arrangement may also be reversed within the scope of the present invention. Typically, cooking or preparation floor 12 has a kitchen area 16 which may contain kitchen fixtures including but not limited to food storage shelving 18, food holding cabinet 20, and food preparation table 22, as shown in FIG. 1, or cooking appliances (not shown), which may, for example, include microwaves, grills, toasters, and/or fryers. Food transport system 10 includes a pick-up station 24 located on cooking or preparation floor 12 adjacent food preparation table 22, a conveyor 26 extending vertically from cooking or preparation floor 12 to serving or dining floor 14 through an opening 27 in cooking or preparation floor 12, carriers 28a-d for carrying food items F on conveyor 26 from cooking or preparation floor 12 to serving or dining floor 14, and a drop-off station 30 for receiving food items F from carriers 28a-d, the drop-off station 30 located on serving or dining floor 14 proximate to conveyor 26 and adjacent an order assembly counter 32 having order assembly counter shelving 33. Pick-up and drop-off stations 24 and 30 are shielded by pick-up and drop-off shields 34 and 36, respectively, shields 34 and 36 helping to discourage or prevent interference with pick-up and drop-off operations. As shown in FIG. 1, conveyor 26 includes a closed-loop member which is a belt 38 defining a closed-loop pathway, a drive rotor 40, and a driven rotor 42, where the rotors 40 and 42 support belt 38 and convey it around the closed-loop pathway by rotating in a drive rotor rotation direction and a driven rotor rotation direction, respectively, as indicated in the Figures by the arrows DRR and RR. Pick-up station 24 is located proximate to an upwardly directed portion of the closed-loop pathway and includes a pick-up slide 44 and a pick-up rack 46. Drop-off station 30 is located proximate to a downwardly directed portion of the closed-loop pathway and includes a drop-off rack 48 and side-members 50 which prevent food items F from falling off the sides of drop-off rack 48. Food items F are picked up by carriers 28a-d as they pass pick-up station 24 in the upward direction indicated in applicable Figures by arrows U, and dropped off by carriers 28a-d as they pass drop-off station 30 in the downward direction indicated in applicable Figures by arrows D. Carriers 28a-d are preferably conveyed continuously around the closed-loop pathway by belt 38. Each carrier 28 includes a carrier body 52 pivotally connected to belt 38, and a carrier rack 54 connected to carrier body 52.

Figure 2A:
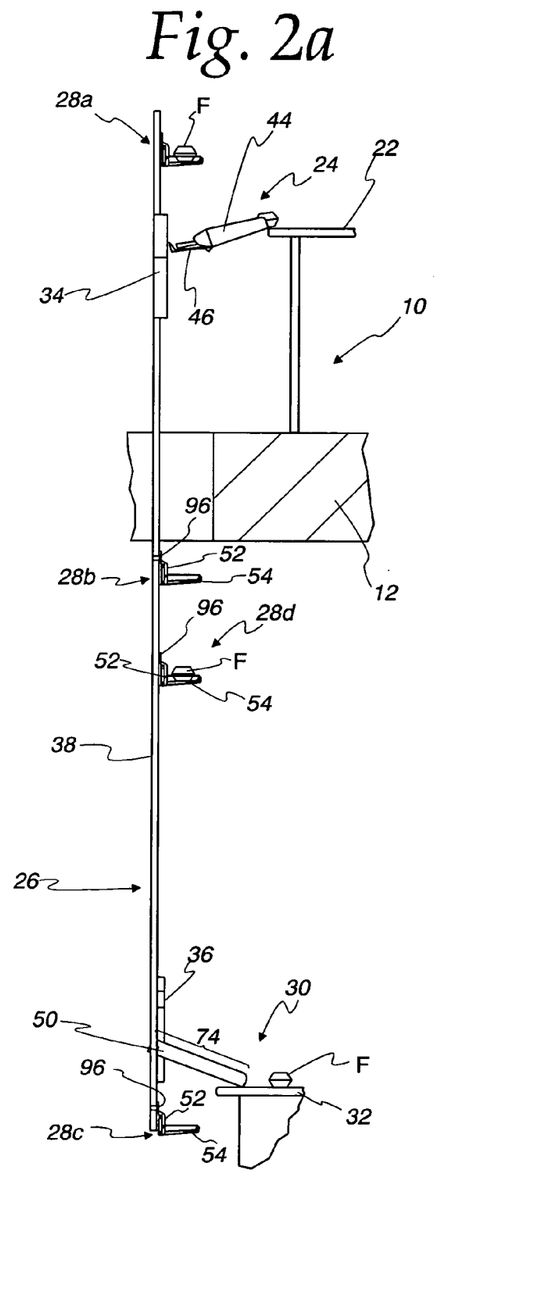
FIG. 2a is a side elevation view of the food transport system 10 removed from the restaurant, wherein the closed loop element of the conveyor is a belt.
Figure 3:
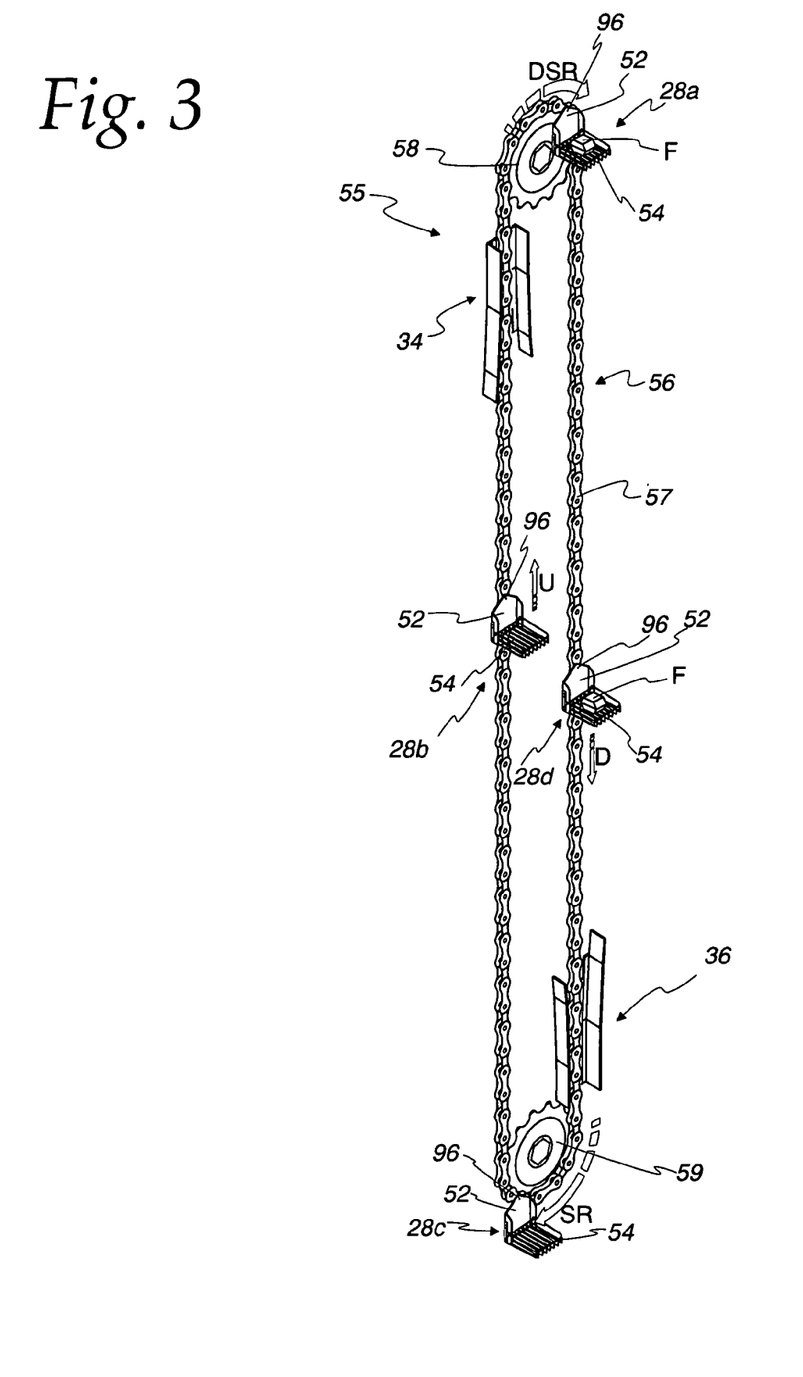
FIG. 3 is a perspective view of an alternative embodiment of food transport system 10, wherein the closed loop element is a chain.

FIG. 2 is a perspective illustration of food transport system 10 removed from the restaurant, with pick-up and drop-off stations 24 and 30 omitted. FIG. 2a is a side elevation view of food transport system 10 removed from the restaurant, including pick-up and drop-off stations 24 and 30 and portions of preparation table 22 and order assembly counter 32. As shown in FIGS. 2 and 2a, conveyor 26 preferably has an elongate oval shape. Although the closed-loop element shown in FIGS. 1 and 2 is belt 38, it may also be any other suitable element capable of being driven around a closed-loop pathway and supporting and transporting at least one food-item carrier 28, which may for instance be an element that is flexible, articulated, or otherwise adapted to revolve around a closed-loop pathway, including a chain, rope, wire or strand, or a complex assemblage including a linkage of wheeled travelers constrained to travel around a fixed track defining the closed loop pathway. By way of example, an alternative conveyor 55 is shown in FIG. 3, wherein the closed-loop element is a chain 56 composed of a plurality of hingedly connected chain links 57, and guided around the closed-loop pathway by the rotation of a drive sprocket 58 and a driven sprocket 59, in the direction indicated by arrows DSR and SR, respectively.

Figures 4, 4A, 5:
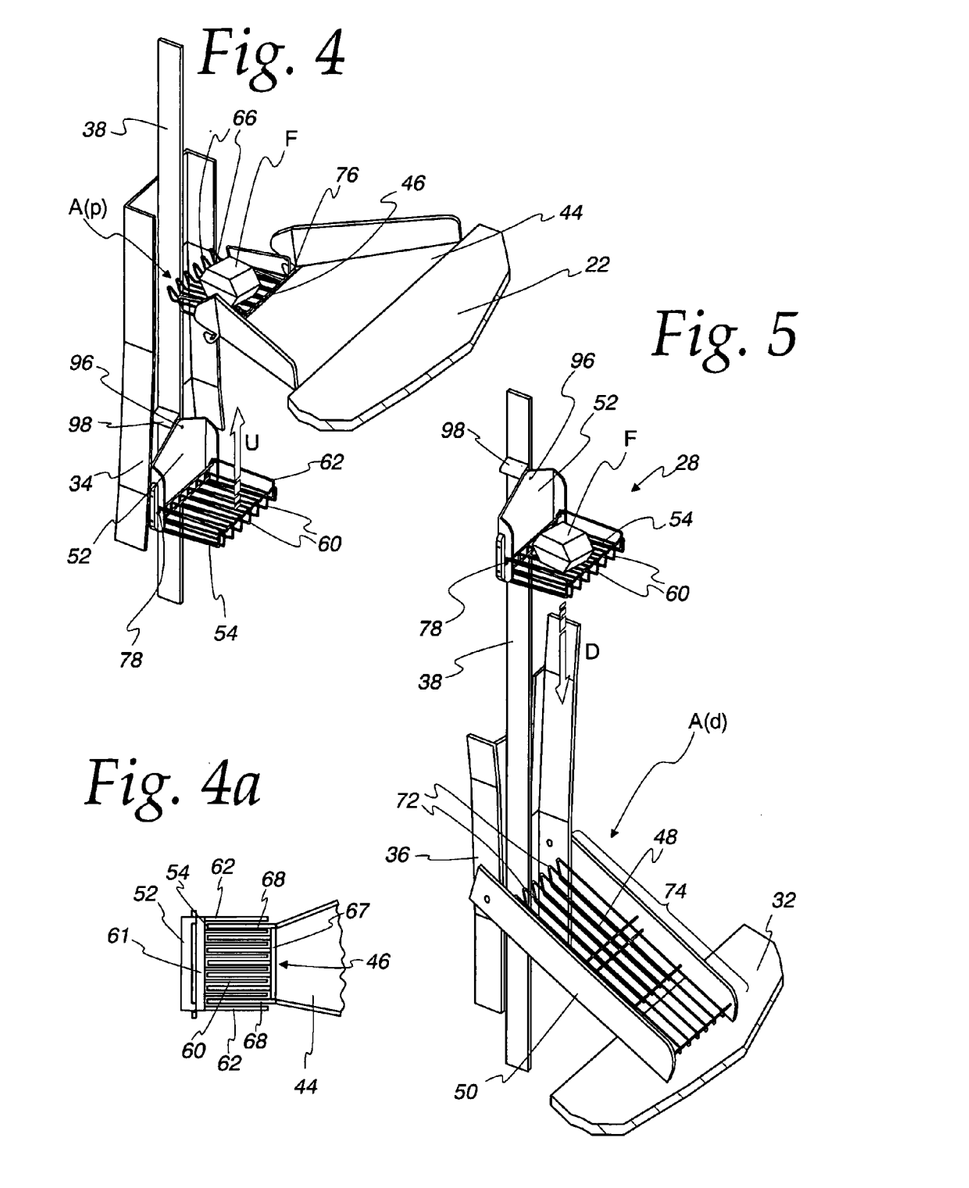
FIG. 4 is a perspective view of carriers 28a-d approaching a pick-up station 24, illustrating the pick-up operation of the invention.
FIG. 4a is a top plan view showing the relation of the pick-up rack to the carrier rack.
FIG. 5 is a perspective view of carriers 28a-d approaching a drop-off station 30, illustrating the drop-off operation of the invention.

Food items are transferred from pick-up station 24 to carriers 28a-d and from carriers 28a-d to the drop-off station 30, by a mechanism illustrated in FIGS. 4 and 5. Turning to FIG. 4, the pick-up of food items is illustrated. Carrier rack 54 is composed of a plurality of spaced-apart food-item carrier support members 60 for supporting food items and side members 62 for preventing food items from falling over the sides of carrier rack 54. Carrier support members 60 preferably have an upturned lip feature 64, as indicated and best seen in FIG. 6, preventing food items F from sliding off the end of carrier rack 54. Likewise, pick-up rack 46 has a plurality of spaced-apart food-item pick-up support members 66 and side members 68, pick-up support members 66 having an upturned lip feature 70 for preventing food items F from sliding off the end of pick-up rack 46. As indicated by arrow U, carrier support members 60 pass between pick-up support members 66 in the upward direction, contacting food item F at exposed portions of its lower surface disposed over the spaces between pick-up support members 66, thereby lifting food item F off of pick-up rack 46. It should be understood that it is unnecessary for the entire length of carrier support members 60 to pass between the entire length of pick-up support members 66; rather, it is sufficient for at least a portion of carrier support members 60 to pass between at least a portion of pick-up support members 66. The area defined by the portion of pick-up support members 66 crossed by carrier support members 60, referred to herein as the "pick-up area," is designated A(p) in FIG. 4. Pick-up slide 44 is inclined downwardly from food preparation table 22 to pick-up rack 46, allowing a human attendant to place a food item F at the top of pick-up slide 44 and thereby cause food item F to slide into pick-up area A(p) without the attendant unnecessarily obstructing pick-up area A(p), such as with the attendant's hand or another part of the attendant's body.

FIG. 4a illustrates the relationship of carrier rack 54 to pick-up rack 46. Specifically, spaced apart carrier support members 60 and side members 62, which are attached to rear support member 61, which extends generally perpendicular to support members 60, are configured and oriented to pass between spaced apart food item pick-up support members 66 and side members 68 of pick-up rack 46, which are attached to rear support 67 of pick-up rack 46, when carrier rack 54 passes by pick-up rack 46. A similar relation is provided for carrier rack 54 relative to drop-off rack 48.

FIG. 5 illustrates the drop-off of food items. As shown, drop-off rack 48 is composed of a plurality of spaced-apart food-item drop-off support members 72. As indicated by arrow D, carrier support members 60 pass between drop-off support members 72 in the downward direction, similarly to the upward passing that occurs in the pick-up of food items, depositing the food item F on drop-off rack 48. As in the pick-up operation, the area of drop-off rack 48 traversed by carrier rack 54, or the "drop-off area," designated A(d) in FIG. 5, need not span the entire length of carrier support members 60 or drop-off support members 72. Drop-off station 30 includes a drop-off incline 74 comprising at least a portion of the drop-off rack 48, causing the deposited food item F to slide out of the drop-off area before the next drop-off pass. Drop-off incline 74 thus prevents food items in drop-off area A(d) from being impacted by the bottom of carrier rack 54.

Figure 6:
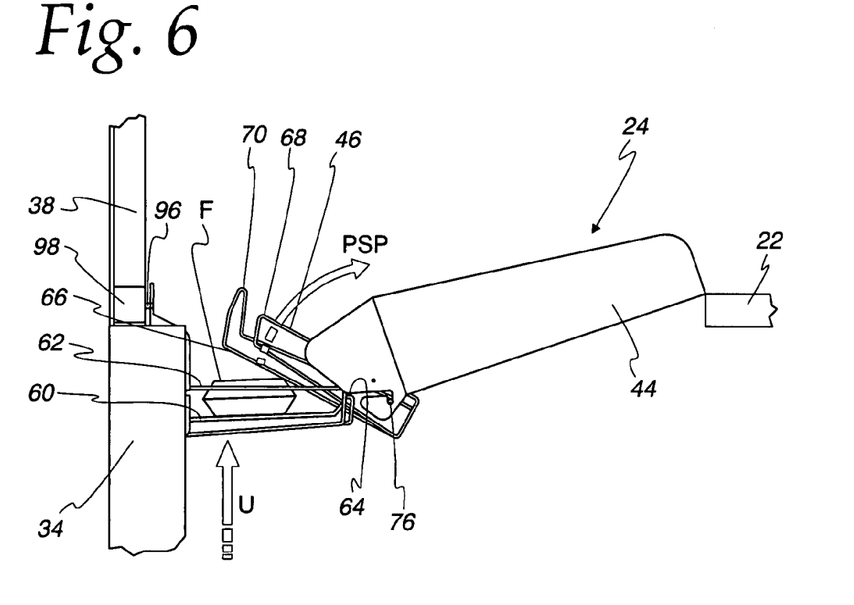
FIG. 6 is a side elevation view illustrating the function of pick-up rack safety pivot 76.
Figure 6A:
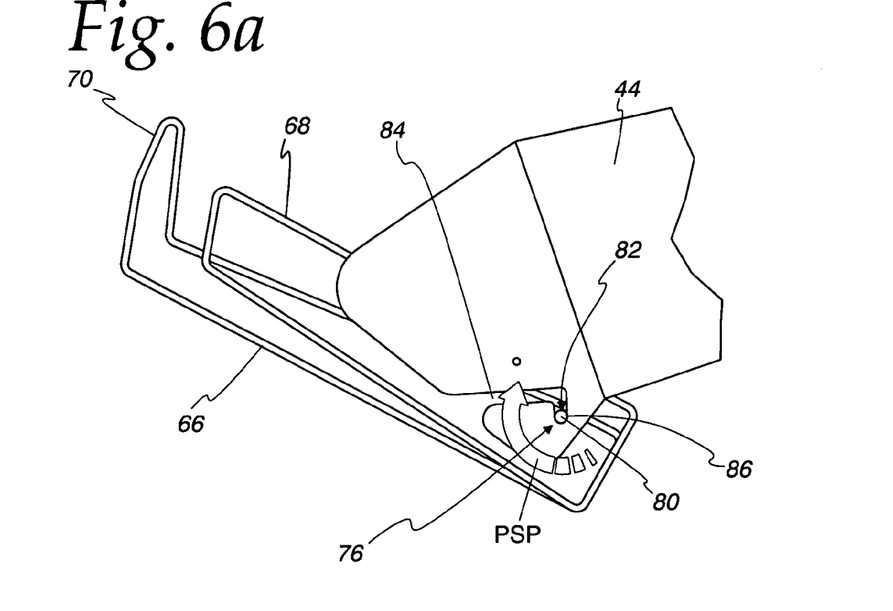
FIG. 6a is a side elevation view illustrating the structure of pick-up rack safety pivot 76.
Figure 7:
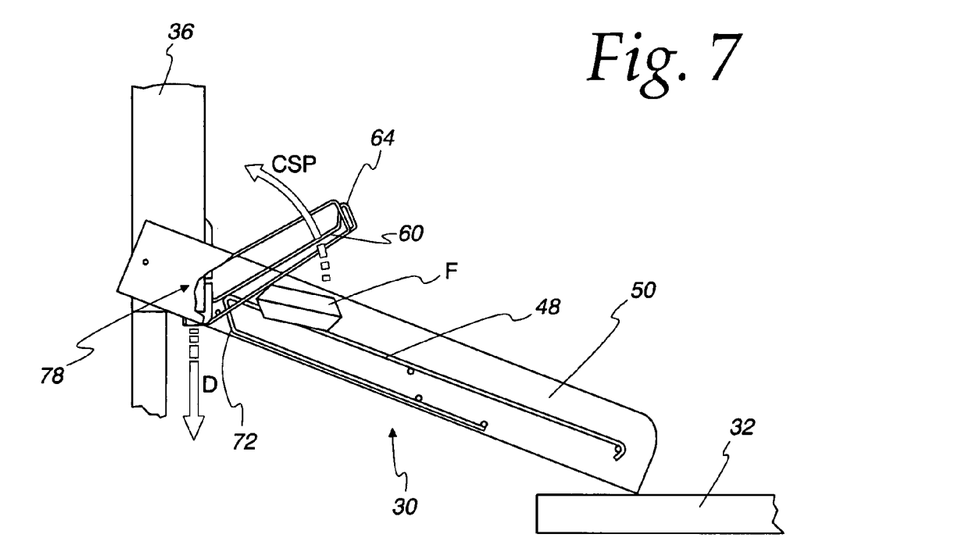
FIG. 7 is a side elevation view illustrating the function of carrier rack safety pivot 78.
Figure 7A:
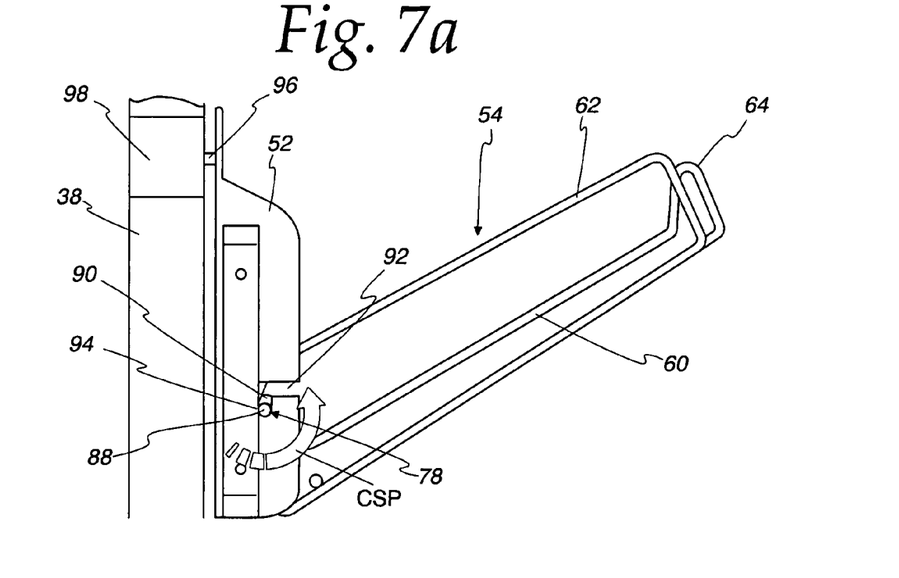
FIG. 7a is a side elevation view illustrating the structure of carrier rack safety pivot 78.

Both carrier rack 54 and pick-up rack 46 preferably have a safety feature allowing them to pivot upward when carrier rack 54 encounters an obstruction. Turning to FIGS. 6 and 7, the pick-up rack safety pivot 76 and carrier rack safety pivot 78 are illustrated, respectively. Pick-up rack safety pivot 76 allows pick-up rack 46 to pivot up and away from the path of carrier rack 54 in the direction indicated by arrow PSP when the upward path of carrier support members 60 between pick-up support members 66 is obstructed, for instance by the inadvertent presence of a food item F on carrier rack 54 immediately prior to a pick-up pass, as shown in FIG. 6, or by a person's hand or other portion of a person's body, for example. As shown in FIG. 6*a*, pick-up rack safety pivot 76 includes a male pivot shaft 80 integral with pick-up rack 46 and a female pivot slot 82 integral with pick-up slide 44. Female pivot slot 82, as illustrated in FIG. 6*a*, includes an open horizontal slot portion 84 continuous with a terminal vertical slot portion 86. Thus, male pivot shaft 80 may easily be slid into horizontal slot portion 84 and dropped into vertical slot portion 86, where it is free to pivot in the direction indicated by arrow PSP. Additionally, a carrier rack safety pivot 78 allows carrier rack 54 to pivot upward and away from drop-off rack 48 in the direction indicated by arrow CSP if the downward path of carrier support members 60 between drop-off support members 72 is obstructed, as shown in FIG. 7. Referring to FIG. 7*a*, carrier rack safety pivot 78 includes a male pivot shaft 88 integral with carrier rack 54 and a female pivot slot 90 integral with carrier body 52. Female pivot slot 90, as illustrated in FIG. 7*a*, includes an open horizontal slot portion 92 continuous with a terminal vertical slot portion 94. Thus, male pivot shaft 88 may easily be slid into horizontal slot portion 92 and dropped into vertical slot portion 94, where it is free to pivot in the direction indicated by arrow CSP.

With reference to carrier, pick-up and drop-off support members 60, 66 and 72, shown in FIGS. 4-7 in the form of upstanding elongate wire loops, it should be noted that these support members may also take other shapes, as suited to the purpose of conveying a particular food item or similar article.

Figure 8:
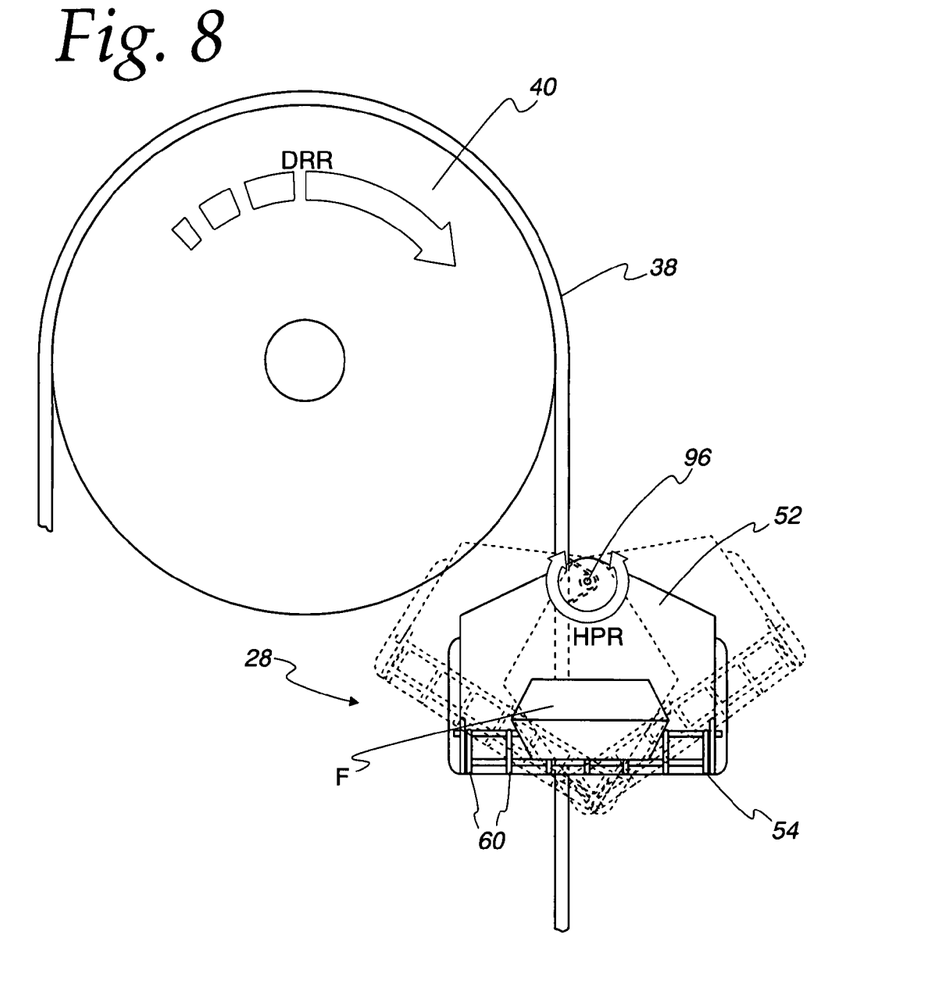
FIG. 8 is a side elevation view of the carriers 28a-d, illustrating the function of carrier hanging pivot 48.

It is important that carrier racks 54 be maintained in a substantially horizontal position as carriers 28*a*-*d* travel around the closed-loop pathway, to avoid spillage or other undesirable disturbance of a conveyed food item. Therefore, with reference to FIG. 8, each carrier 28 is preferably mounted to the closed-loop element by a carrier hanging pivot 96. When the closed-loop element is belt 38, carrier hanging pivot 96 may be housed in a belt protuberance 98, as best shown in FIGS. 4 and 5. Carrier hanging pivot 96 allows each carrier 28 to freely pivot in the side-to-side rotational directions indicated in FIG. 8 by arrow HPR. In particular, each carrier 28 will pivot about carrier hanging pivot 96 as it traverses a turn in the closed-loop pathway, permitting each carrier 28 to remain substantially horizontal at all times. Some oscillation of each carrier 28 about carrier hanging pivot 96 will typically occur during and following a turn. Such oscillation is acceptable as long as the oscillation does not substantially harm the integrity of food item F or substantially interfere with the passage of carrier rack 54 through pick-up rack 46 or drop-off rack 48.

While the invention has been described with respect to certain preferred embodiments, as will be appreciated by those skilled in the art, it is to be understood that the invention is capable of numerous changes, modifications and rearrangements, and such changes, modifications and rearrangements are intended to be covered by the following claims.

What is claimed is:

1. A system for transporting food items comprising
    a) a conveyor having a closed-loop element defining a closed-loop pathway having at least a generally upwardly extending portion and a generally downwardly extending portion;
    b) at least one carrier having an article-supporting carrier rack, the carrier rack comprising a plurality of spaced-apart support members and the carrier pivotally mounted to the closed-loop element to maintain the carrier rack in a horizontal position as the carrier travels around the closed-loop pathway and the carrier rack being pivotally mounted with respect to the closed-loop element to allow the carrier rack to pivot upwardly about an axis generally perpendicular to the carrier support members so as to allow the carrier support members to pivot towards a generally vertical orientation when the downward path of the carrier rack is obstructed;
    c) a pick-up station associated with the generally upwardly extending portion of the conveyor and having an article-supporting pick-up rack, the pick-up rack comprising a plurality of spaced-apart support members positioned so that at least a portion of the carrier support members pass between at least a portion of the pick-up support members in the upward direction as the carrier travels past the pick-up rack, the at least a portion of the pick-up support members defining a pick-up area; and
    d) a drop-off station associated with the generally downwardly extending portion of the conveyor and having an article-supporting drop-off rack, the drop-off rack comprising a plurality of spaced-apart support members positioned so that at least a portion of the carrier support members pass between at least a portion of the drop-off support members in the downward direction in a carrier drop-off pass, the at least a portion of the drop-off support members defining a drop-off area.

2. The food transport system of claim 1, wherein the pick-up station comprises an inclined pick-up slide adjacent the pick-up rack, the pick-up slide directed downwardly toward the pick-up rack.

3. The food transport system of claim 1, wherein at least a portion of the drop-off rack is inclined to cause an article deposited on the drop-off rack to slide out of the drop-off area before the next carrier drop-off pass.

4. The food transport system of claim 1, wherein the pick-up rack is pivotally mounted with respect to the pick-up station to allow the pick-up rack to pivot upwardly about an axis that is generally perpendicular to the pick-up support members so as to allow the pick-up support members to pivot towards a generally vertical orientation when the carrier support members are obstructed from passing between the pick-up support members in the upward direction.

5. The food transport system of claim 1, wherein the closed-loop element is a belt.

6. The food transport system of claim 1, wherein the closed-loop element is a chain.

7. The food transport system of claim 1, further comprising a track defining the closed-loop pathway, wherein the closed-loop element is a plurality of hingedly connected travelers constrained to travel along the track.

8. A method of vertically transporting food items comprising the steps of
    a) providing a food transport system comprising
    a conveyor having a closed-loop element disposed along a closed-loop pathway having at least a generally upwardly and a generally downwardly extending portion;
    at least one carrier having a food item supporting carrier rack,
    the carrier rack comprising a plurality of spaced-apart support members and
    the carrier pivotally mounted to the closed-loop element to maintain the carrier rack in a horizontal position as the carrier travels around the closed-loop pathway;

a pick-up station having a food item supporting pick-up rack, the pick-up rack comprising a plurality of spaced-apart support members; and a drop-off station having a food item supporting drop-off rack, the drop-off rack comprising a plurality of spaced-apart support members, wherein the carrier rack is pivotally mounted with respect to the closed-loop element to allow the carrier rack to pivot upwardly about an axis generally perpendicular to the carrier support members so as to allow the carrier support members to pivot towards a generally vertical orientation when the downward path of the carrier rack is obstructed;

b) placing the food item in the pick-up area;

c) causing the closed-loop element to travel around the closed-loop pathway so that at least a portion of the carrier support members pass between at least a portion of the pick-up support members in the upward direction as the carrier travels past the pick-up rack to pick up the food item onto the carrier rack, the at least a portion of the pick-up support members defining a pick-up area, and at least a portion of the carrier support members pass between at least a portion of the drop-off support members in the downward direction in a carrier drop-off pass to deposit the food item onto the drop-off rack, the at least a portion of the drop-off support members defining a drop-off area.

9. The method of claim 8, wherein the causing the closed-loop element to travel around the closed-loop pathway includes causing the closed-loop element to continuously travel around the closed-loop pathway.

10. The method of claim 8, wherein the placing the food item in the pick-up area includes placing the food item on an inclined slide adjacent the pick-up rack so that the food item slides into the pick-up area.

11. The method of claim 8, further comprising providing an incline to at least a portion of the drop-off rack so that the food item deposited on the drop-off rack slides out of the drop-off area before the next carrier drop-off pass.

* * * * *